United States Patent
Douglas et al.

(10) Patent No.: US 11,054,059 B2
(45) Date of Patent: Jul. 6, 2021

(54) VALVES FOR MICROFLUIDIC DEVICES

(71) Applicant: Fluidic Analytics Limited, Cambridge (GB)

(72) Inventors: Anthony Douglas, Cambridge (GB); Tuomas Pertti Jonathan Knowles, Cambridge (GB); Thomas Mueller, Oberengstringen (CH); Liam Dower, Cambridge (GB)

(73) Assignee: Fluidic Analytics Limited, Cambridge (GB)

( * ) Notice: Subject to any disclaimer, the term of this patent is extended or adjusted under 35 U.S.C. 154(b) by 0 days.

(21) Appl. No.: 16/330,118

(22) PCT Filed: Sep. 11, 2017

(86) PCT No.: PCT/GB2017/052652
§ 371 (c)(1),
(2) Date: Mar. 4, 2019

(87) PCT Pub. No.: WO2018/046954
PCT Pub. Date: Mar. 15, 2018

(65) Prior Publication Data
US 2019/0234530 A1    Aug. 1, 2019

(30) Foreign Application Priority Data
Sep. 12, 2016    (GB) ..................... 1615452

(51) Int. Cl.
*F16K 99/00* (2006.01)
*B01L 3/00* (2006.01)

(52) U.S. Cl.
CPC ...... *F16K 99/0015* (2013.01); *B01L 3/50273* (2013.01); *B01L 3/502707* (2013.01);
(Continued)

(58) Field of Classification Search
CPC ............ F16K 99/0015; F16K 99/0057; F16K 2099/0084; B01L 3/502707;
(Continued)

(56) References Cited

U.S. PATENT DOCUMENTS 6,644,944 B2 * 11/2003 Karp .................. F04B 53/1047
                                                              417/566
7,431,050 B2 * 10/2008 Yamazaki ......... B01L 3/502738
                                                              137/827
(Continued)

FOREIGN PATENT DOCUMENTS

EP          2738431 A1 *  6/2014  ............... F16K 7/17
WO    WO 2017/141048 A1    8/2017
(Continued)

OTHER PUBLICATIONS

Search Report for App. No. GB 1615452.8 dated Feb. 8, 2017. 7 pages.
(Continued)

*Primary Examiner* — William M McCalister
(74) *Attorney, Agent, or Firm* — Wolf, Greenfield & Sacks, P.C.

(57) ABSTRACT

A single-layer valve is provided. The valve comprises a microfluidic pathway at least partially defined by a flexible membrane which is configured to deform when subjected to an actuation torque, and a discontinuity bounded by a first surface. The length of the discontinuity is constant across the full width of the first surface. The valve is configured such that the actuation torque on the membrane is larger in a first direction than a second direction substantially opposite to the first direction.

15 Claims, 9 Drawing Sheets

(52) U.S. Cl.
CPC ... *B01L 3/502715* (2013.01); *B01L 3/502738* (2013.01); *B01L 3/502746* (2013.01); *F16K 99/0057* (2013.01); *B01L 2200/0689* (2013.01); *B01L 2300/049* (2013.01); *B01L 2300/0816* (2013.01); *B01L 2300/0887* (2013.01); *B01L 2300/123* (2013.01); *B01L 2300/14* (2013.01); *F16K 2099/0084* (2013.01); *Y10T 137/7895* (2015.04)

(58) Field of Classification Search
CPC .......... B01L 3/502715; B01L 3/50273; B01L 3/502738; B01L 3/502746; B01L 2200/0689; B01L 2300/049; B01L 2300/0816; B01L 2300/0882; B01L 2300/123; B01L 2300/14; Y10T 137/7895
USPC ........................................................ 137/859
See application file for complete search history.

(56) References Cited

U.S. PATENT DOCUMENTS

| | | | | |
|---|---|---|---|---|
| 7,771,176 | B2* | 8/2010 | Weber | F04B 43/046 417/410.2 |
| 7,942,160 | B2* | 5/2011 | Jeon | F16K 99/0034 137/15.19 |
| 7,980,272 | B2* | 7/2011 | Park | F16K 99/0001 137/828 |
| 8,220,493 | B2* | 7/2012 | Easley | F16K 99/0057 137/829 |
| 8,388,908 | B2* | 3/2013 | Blaga | B01L 3/502738 422/503 |
| 8,584,703 | B2* | 11/2013 | Kobrin | B01F 11/0071 137/597 |
| 9,108,192 | B2* | 8/2015 | Weber | B01L 3/50 |
| 9,664,304 | B2* | 5/2017 | Laermer | F16K 99/0036 |
| 9,952,222 | B2 | 4/2018 | Yates et al. | |
| 9,958,369 | B2 | 5/2018 | Cohen et al. | |
| 10,295,545 | B2 | 5/2019 | Yates et al. | |
| 10,386,332 | B2 | 8/2019 | Herling et al. | |
| 10,620,102 | B2 | 4/2020 | Mueller et al. | |
| 10,670,504 | B2 | 6/2020 | Cohen et al. | |
| 2007/0026269 | A1* | 2/2007 | Nakakubo | H01M 8/04089 137/859 |
| 2007/0041878 | A1* | 2/2007 | Bryning | B01L 3/502738 422/504 |
| 2007/0251592 | A1* | 11/2007 | Christenson | F16K 99/0057 137/859 |
| 2010/0186839 | A1* | 7/2010 | Namkoong | B01L 3/502738 137/825 |
| 2010/0266432 | A1 | 10/2010 | Pirk et al. | |
| 2010/0308051 | A1* | 12/2010 | Weber | B01L 3/502715 220/266 |
| 2011/0186466 | A1* | 8/2011 | Kurowski | B01L 3/502715 206/524.6 |
| 2012/0214254 | A1 | 8/2012 | Schmidt et al. | |
| 2013/0055889 | A1 | 3/2013 | Herz et al. | |
| 2014/0166133 | A1 | 6/2014 | Fu et al. | |
| 2014/0174161 | A1 | 6/2014 | Ono | |
| 2017/0052147 | A1 | 2/2017 | Herling et al. | |
| 2017/0173583 | A1 | 6/2017 | Kitamoto | |
| 2018/0188145 | A1 | 7/2018 | Mueller et al. | |
| 2018/0267054 | A1 | 9/2018 | Yates et al. | |
| 2018/0328831 | A1 | 11/2018 | Cohen et al. | |
| 2019/0201903 | A1 | 7/2019 | Douglas et al. | |
| 2019/0234530 | A1* | 8/2019 | Douglas | B01L 3/502707 |
| 2019/0247853 | A1 | 8/2019 | Douglas et al. | |
| 2019/0247855 | A1 | 8/2019 | Douglas et al. | |
| 2019/0331692 | A1 | 10/2019 | Yates et al. | |
| 2019/0344267 | A1 | 11/2019 | Knowles et al. | |

FOREIGN PATENT DOCUMENTS

| | | |
|---|---|---|
| WO | WO 2017/174975 A1 | 10/2017 |
| WO | WO 2018/002596 A1 | 1/2018 |
| WO | WO 2018/042190 A1 | 3/2018 |
| WO | WO 2018/046952 A1 | 3/2018 |
| WO | WO 2018/046953 A1 | 3/2018 |

OTHER PUBLICATIONS

International Search Report and Written Opinion for PCT/GB2017/052652 dated Nov. 17, 2017. 14 pages.

Leslie et al., Frequency-specific flow control in microfluidic circuits with passive elastomeric features. Nature Physics. Mar. 2009;5:231-5. Epub Feb. 1, 2009.

Yuen et al., Semi-disposable microvalves for use with microfabricated devices or microchips. Journal of Micromechanics and Microengineering. 2000;10:401-9.

* cited by examiner

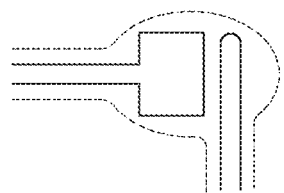
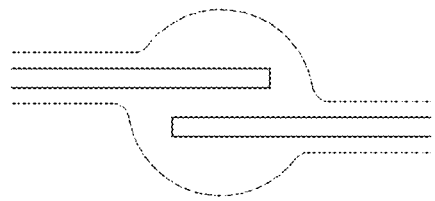
Fig. 5A            Fig. 5B
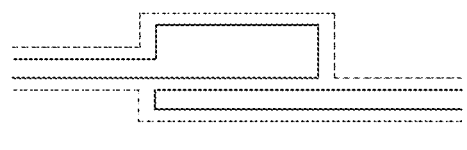
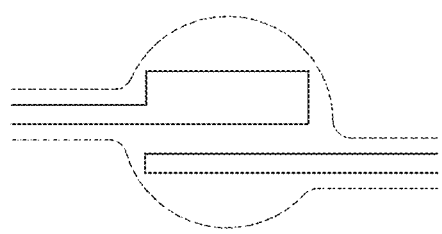
Fig. 5C            Fig. 5D
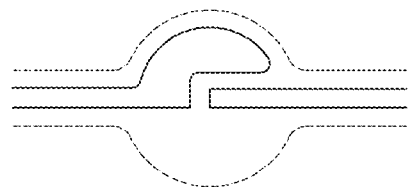
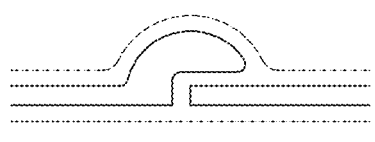
Fig. 5E            Fig. 5F
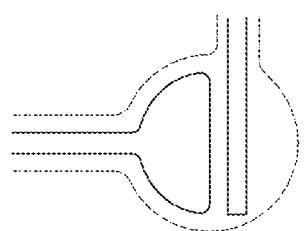
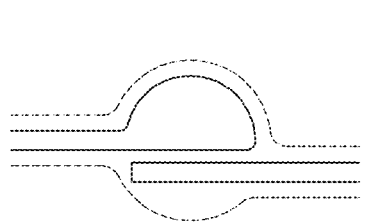
Fig. 5G            Fig. 5H

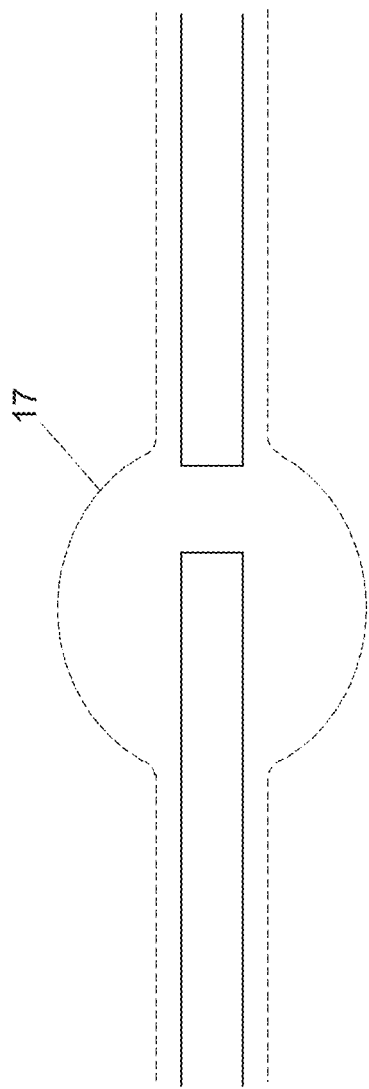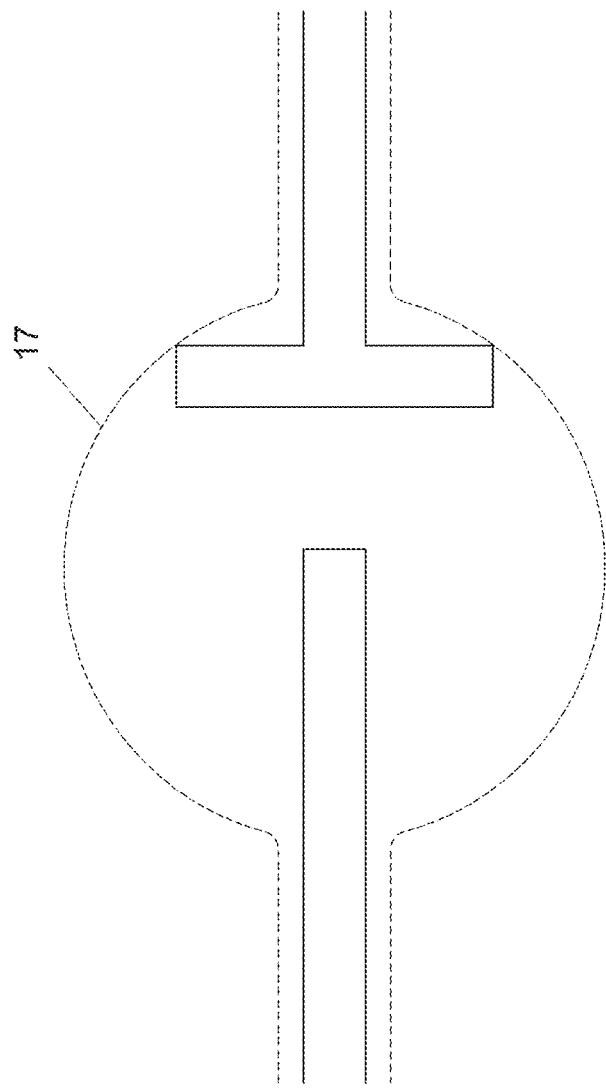

VALVES FOR MICROFLUIDIC DEVICES

RELATED APPLICATIONS

This application is a national stage filing under 35 U.S.C. § 371 of international application number PCT/GB2017/052652, filed Sep. 11, 2017, which claims priority to GB application number GB1615452.8, filed Sep. 12, 2016, each of which is herein incorporated by reference in its entirety.

The present invention relates to a microfluidic device and in particular, a microfluidic device comprising a valve to provide a preferential fluid flow. The invention also relates to the control of fluid flow in such a microfluidic device. Microfluidic devices are becoming increasingly important in analysing small volumes of fluids containing biological and chemical components.

Microfluidic devices offer a number of useful capabilities for example, the ability to use very small quantities of samples and reagents, and to carry out separations and detections with high resolution and sensitivity. Standard devices that typically operate on larger volumes are generally unsuitable for precise and small dispersion control of fluids. Moreover, surface to volume ratio is minimised and the laminar is established only with difficulty in standard devices. In contrast, these features appear to be more applicable and prominent at much smaller volumes in microfluidic devices. Therefore, analysis of very small volumes of fluid (sub-millimetre scale) in microfluidic devices can introduce a new set of conditions that are not apparent on a larger scale.

In the context of microfluidic devices, valves are advantageous in that they enable the devices to be used for performing complex fluid handling procedures. For example, valves could be used to control the direction of fluid, for instance to switch reagents, to inject small volumes of reagents and/or analytes in a controlled manner, or to conduct procedures for removal of air from a microchannel network. However, commonly available valves for microfluidic devices have multi-layer structures that are often complex and costly to fabricate. Alternatively, there are single layer valves such as burst valves or a screw valves that can be used in microfluidic devices.

The frequency-specific flow control in microfluidic circuits with passive, symmetrical elastomeric features has been discussed by Daniel C Leslie et al. in Nature physics, published 1 Feb. 2009.

It is against this background that the present invention has arisen.

The invention relates to the use of a single-layer valve to provide a directional fluid flow within a microfluidic device and, more particularly, to provide a low-volume valve with a small hydrodynamic resistance in the open position. In addition, the single layer valve can provide a diode-like valve within such a device. In the context of this invention, the term diode is used to imply a non-linear functionality that strongly favours flow in a first direction over that a second direction that is opposite to the first direction. In the context of this invention, the term "single layer" refers to the presence of a single layer of fluidic and/or pneumatic channels. This distinguishes valves of this type from others which include a membrane located between two or more layers of channels. The presence of other layers that are not functionally connected to the valve, does not preclude the valve itself being a single layer valve.

According to the present invention there is provided a single-layer valve comprising a microfluidic pathway at least partially defined by a flexible membrane which is configured to deform when subjected to an actuation torque, a discontinuity bounded by a first surface, wherein the length of the discontinuity is constant across the full width of the first surface; and wherein the valve is configured such that the actuation torque on the membrane is larger in a first direction than a second direction substantially opposite to the first direction. Alternatively, the single-layer valve comprises a microfluidic pathway at least partially defined by a flexible membrane which is configured to deform when subjected to an actuation torque, a discontinuity bounded by a first surface, wherein the length of the discontinuity is constant across the full width of the first surface; and wherein the first surface is tortuous.

The hydrodynamic resistance of the valve is influenced by the length of the discontinuity, the width of the first surface and also the shape and position of pathway, as well as the magnitude of the actuation torque and the stiffness of the flexible membrane.

The intention of the claimed configuration is to minimise the hydrodynamic resistance and this is achieved in part by ensuring that the length of the discontinuity is minimal and thus constant. This is achieved by closely mapping every contour of the discontinuity so that the discontinuity is the same along its entire length.

The actuation torque is influenced by the valve footprint area and its shape, as well as the applied pressure. For example, the actuation torque would be greater if the same sized and shaped valve footprint area and first surface were located close to the edge of the valve, rather than in the centre of the valve.

As used herein, and unless otherwise stated, the term "microfluidic" refers to fluids that are geometrically constrained to very small volumes, typically in the sub-millimetre scale in at least one direction. These small volumes of fluids can be controlled, manipulated and separated in a microfluidic device.

The width of the first surface may be considerably greater than the length of the discontinuity. Additionally, or alternatively, the first surface may be tortuous. In these embodiments, the maintenance of a constant width discontinuity presents some challenges and it is important to ensure that the first surface is configured to keep the length of the discontinuity constant. Ensuring that the surfaces are separated by a minimal and constant distance or interval keeps the valve resistance in its open state minimal. In some embodiments, the tortuous nature of the first surface may include one or more abrupt changes in direction. Around these direction changes, a smooth radius is created so that no sharp corners are presented on either the first surface or a second surface defining the extremities of the tip. In some embodiments, the tip is arcuate and the first surface is therefore configured to provide an offset which matches the arc of the tip and to avoid approximations created by 90° corners. If such corners were to be included, they would constitute areas where increased torque is required in order to facilitate the opening of the valve. For example, in the valves disclosed in Journal of Micromechanics and Microengineering, volume 10, Jan. 9, 2000 Po Li Yuen et al "Semi-disposable microvalves for use with microfabricated device or microchips" and shown in FIG. 1 of that publication, all of the illustrated valves have rectilinear configurations including 90° corners. The length of the discontinuity at these corners exceeds the length in the remainder of the discontinuity, resulting in higher resistance and a larger actuation torque than would be required if these corners were rounded out to provide a constant radius and therefore constant gap length.

The microfluidic device may be provided with a pressure conduit substantially coaxial with the microfluidic pathway. As a result, applying a pressure difference to the pressure conduit can actuate the fluids along the microfluidic pathways. In some embodiments, actuation of fluids along the microfluidic pathways can be achieved by pressure driven laminar flow.

In addition, the microfluidic pathway may be partially defined by a flexible membrane so that a local change in a cross sectional area of the microfluidic pathway may be achieved, resulting in a preferential fluid flow in the first direction. In some embodiments, the local change in the cross sectional area can be caused by a change in pressure along the pressure conduit.

As a result of the discontinuity and the increased surface area portion, the microfluidic valve is inherently asymmetric. This is advantageous as it reduces the pressure required through the pressure conduit in order to provide effective control over the flow of fluids.

The fluid flow in a second direction, which may be substantially opposite to the fluid flow in the first direction, can be minimal.

In some embodiments, the fluids that flow along the microfluidic pathways, in use, are aqueous solutions, which can contain peptides or nucleic acid components.

In some embodiments, the valve can be at least 0.1 to 10 mm in diameter, or it may exceed 0.5, 1.0 or 1.5 mm. The valve can be less than 10 mm in diameter, or less than 5, 2.5 or 2.0 mm. For example the single layer can be 1.5 mm in diameter.

In some embodiments, the valve can be at least 0.005 to 5 mm in height, or it may exceed 0.01, 0.05, 0.07, 1 or 2 mm in height. The valve may be less than 4, 3.5, 3 or 2.5 mm in height. For example, the valve can be 0.07 mm in height.

In some embodiments, the microfluidic pathway can be at least 0.005 to 10 mm in width or it may exceed 0.01, 0.05, or 0.1 mm in width. The microfluidic pathway can also be less than 4, 2, 1 or 0.5 mm in width. For example, the microfluidic pathway can be 0.1 mm in width.

In some embodiments, the discontinuity can have a gap length of at least 0.01 to 10 mm, or it may exceed 0.05, 0.01 or 0.5 mm. the gap length can be less than 5, 2.5 or 1 mm. For example, the gap length can be 0.1 mm.

Having a large dead volume within a valve can be wasteful and may critically affect the level of control that can be exerted over the fluid and in turn, the resolution and efficiency of separation of components. Therefore, smaller or zero dead volumes within a valve can significantly improve the separation, resolution and detection of biological or chemical components in fluids. In some embodiments, the single-layer valve can have a dead volume and a swept volume of at least 0.01 to 1 µL or it may exceed 0.025, 0.05 or 0.1 µL. The swept and dead volumes can be less than 0.75, 0.5 or 0.25 µL. For example, the dead volume can be zero and the swept volume can be 0.1 µL.

In another aspect of the invention, one or more valves may be combined into a microfluidic device. Typically, valves in microfluidic devices are particularly useful for controlling the flow of fluids along microfluidic pathways. In some embodiments, the microfluidic device may be provided with a single layer valve. A single layer valve may be easier to fabricate than multi-layer valves, which greatly reduces manufacturing costs. In addition, single layer valves may have a simplified structure that makes it easier to integrate into a microfluidic device than multi-layer valves.

The microfluidic device may further comprise a sealing film disposed over the microfluidic pathway, which encloses the microfluidic pathway and can act as the deformable membrane. In such embodiments a functional valve can be incorporated without any additional fabrication steps. Sealing the microfluidic device against a film is particularly advantageous because it may prevent fluids leaking out of the device.

The microfluidic device may further comprise an actuatable plunger, wherein the actuatable plunger can be configured to depress at least a section of the microfluidic pathway, thereby obstructing the fluid flow in first and second directions. The actuation may be through a solenoid or a pneumatic actuator. In one preferred embodiment, a pneumatically actuated plunger may depress a section of the microfluidic pathway located at the valve.

In some embodiments, the pressure applied along the pressure conduit can be from 1 to 1000 kPa. In some embodiments, the pressure can be at least 1 kPa, or it may exceed 5, 10, 20, 40, 80, 100, 200, 400 kPa. In some embodiments, the pressure can be less than 1000 kPa, or less than 900, 800, 700, 600 or 500 kPa.

In some embodiments, the sealing film is within the range of 10 to 500 µm thick, or it may exceed 10, 50, 100, 200 or 250 µm. The sealing film may be less than 500, 450, 400 or 350 µm thick. For example, the sealing film is 150 µm thick.

Preferably, the sealing film is applied using a laser welding instrument. The use of a laser welding instrument is particularly advantageous because it provides a quick and highly accurate process for sealing the microfluidic device against the film at specific positions, while leaving the film unattached at other locations. Moreover, other forms of selective sealing can be used to seal the microfluidic device against a film.

In another aspect of the present invention, there is provided a method of controlling fluid flow through a microfluidic device according to the previous aspect of the invention, the method comprising flowing a first fluid along the microfluidic pathway, applying pressure along the pressure conduit in order to effect a deflection in the membrane and a corresponding change in fluid flow; and obstructing the flow of the first fluid by the application of a pneumatically actuated plunger.

In some embodiments, the flow of a second fluid along the microfluidic pathway, substantially opposite to the flow of the first fluid may be minimal.

The invention will now be further and more particularly described, by way of example only, and with reference to the accompanying drawings, in which:

FIG. 1A shows a section of a valve according to the present invention;

FIG. 1B provides a side view of the valve of FIG. 1A in a closed position;

FIG. 1C provides a side view of the valve of FIG. 1A in an open position;

Figure 3:
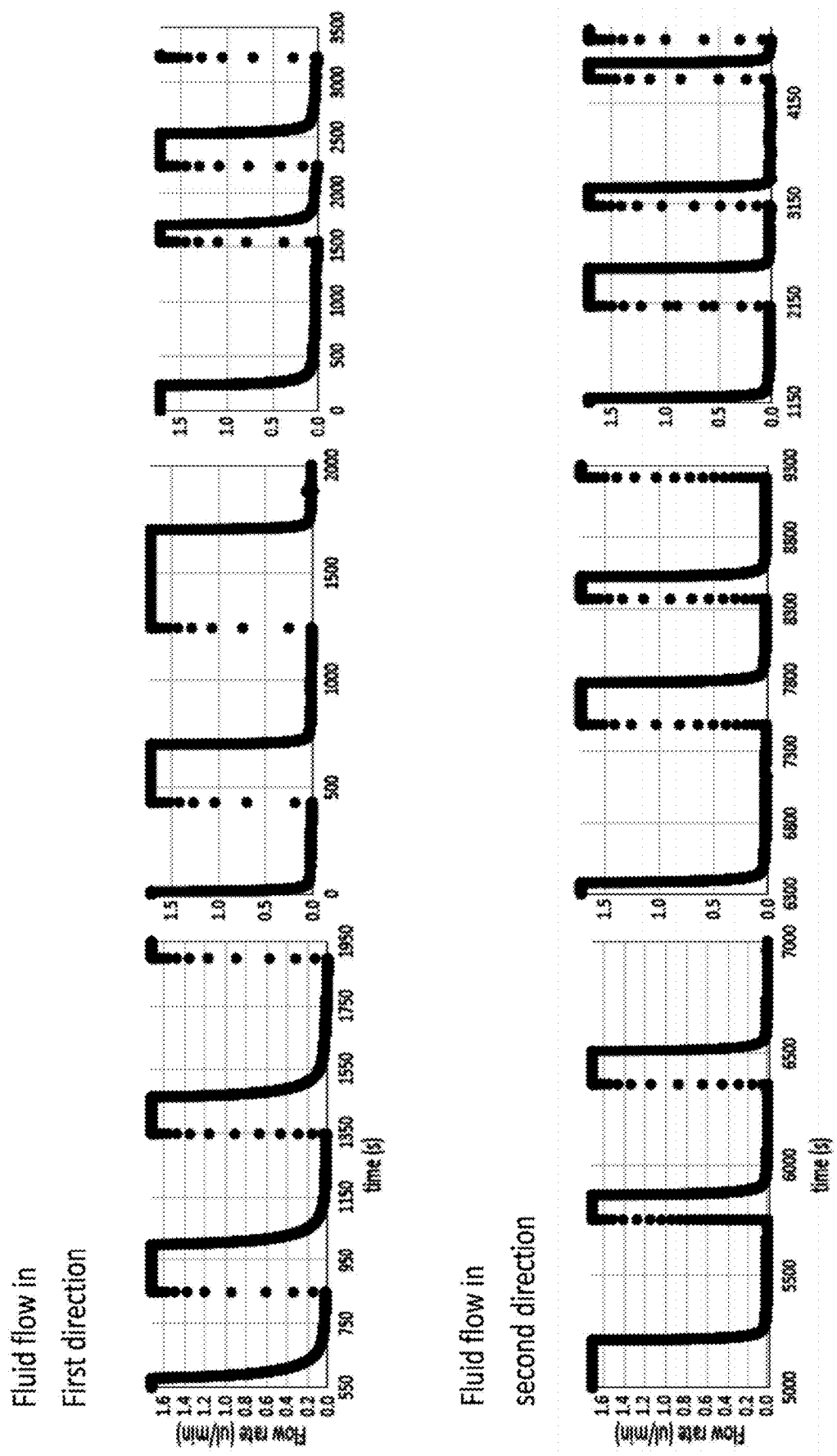
Figure 4:
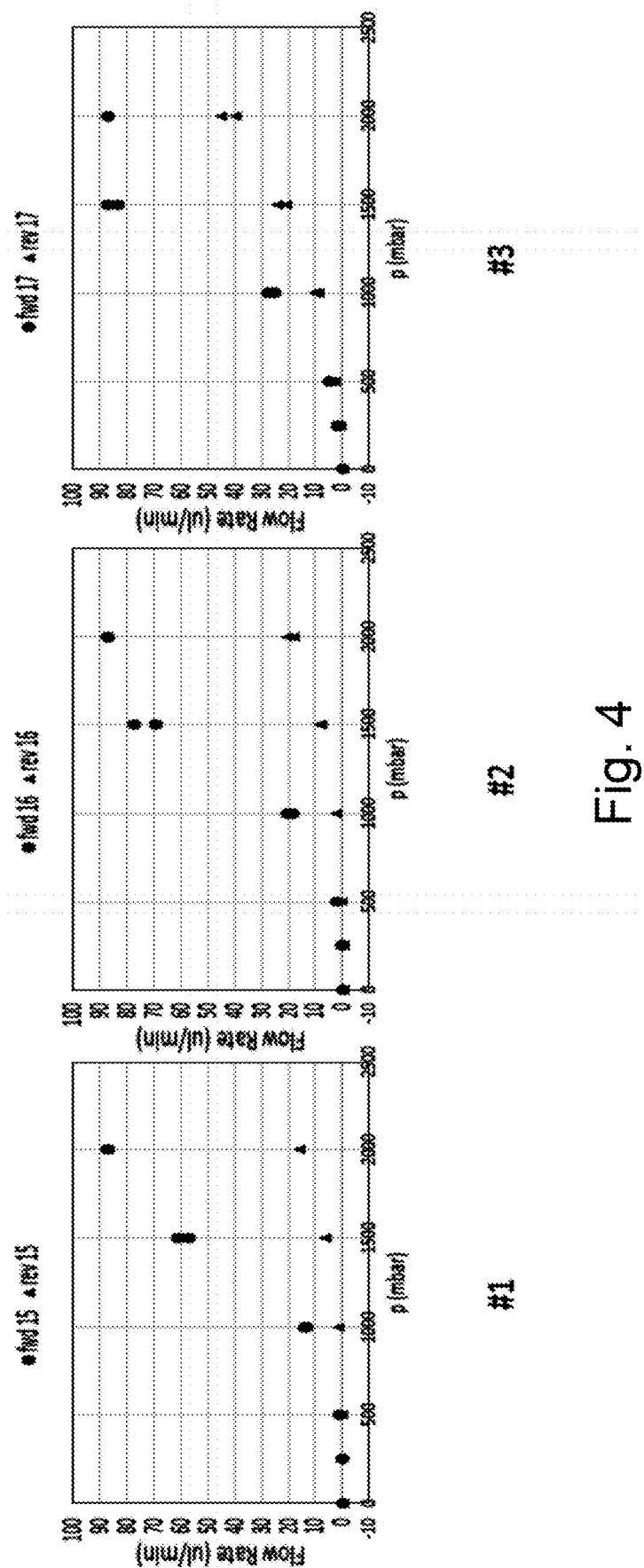
Figure 5I:
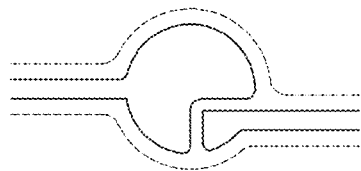
Figure 5J:
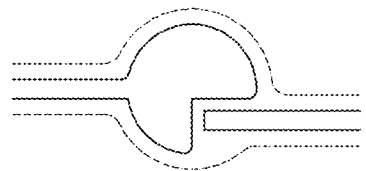
Figure 5K:
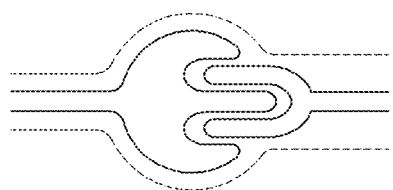
Figure 5L:
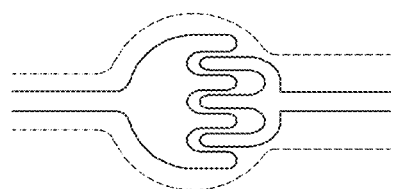
Figure 5M:
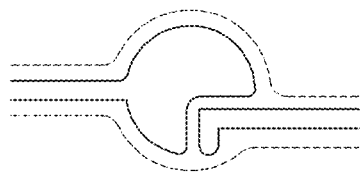
Figure 5N:
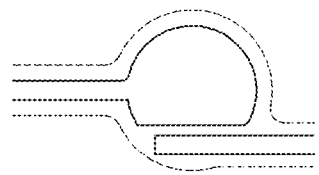
Figure 5O:
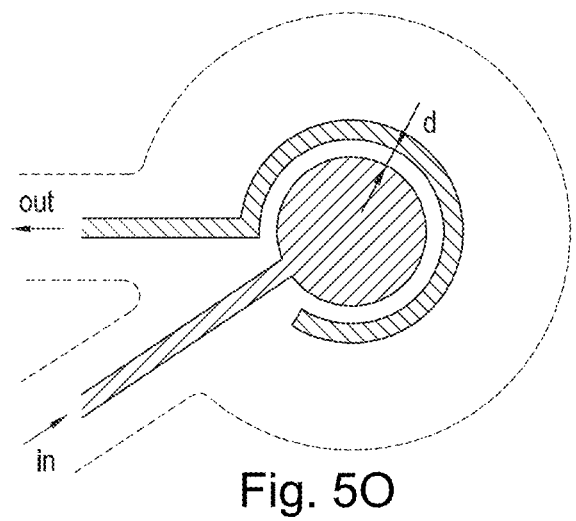
Figure 5P:
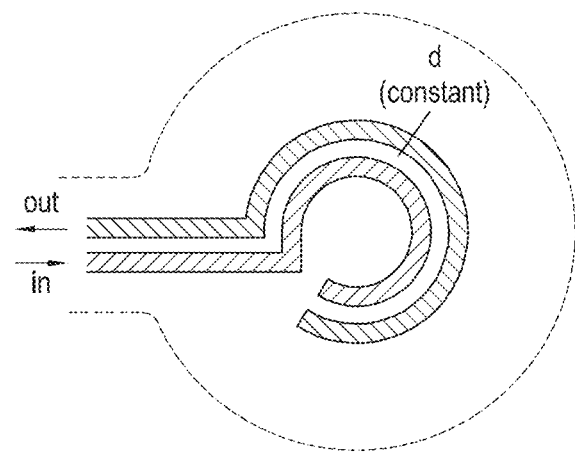
Figure 5Q:
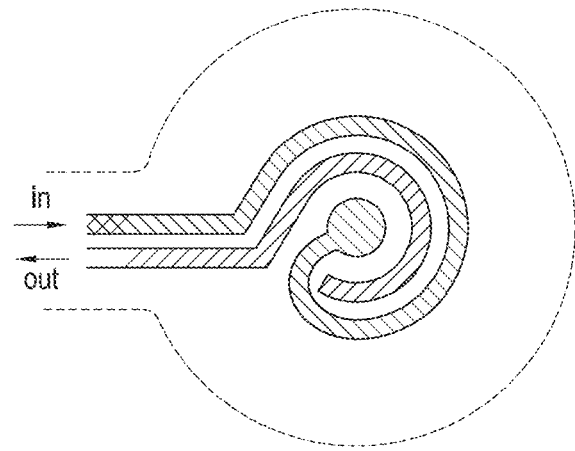
Figure 5R:
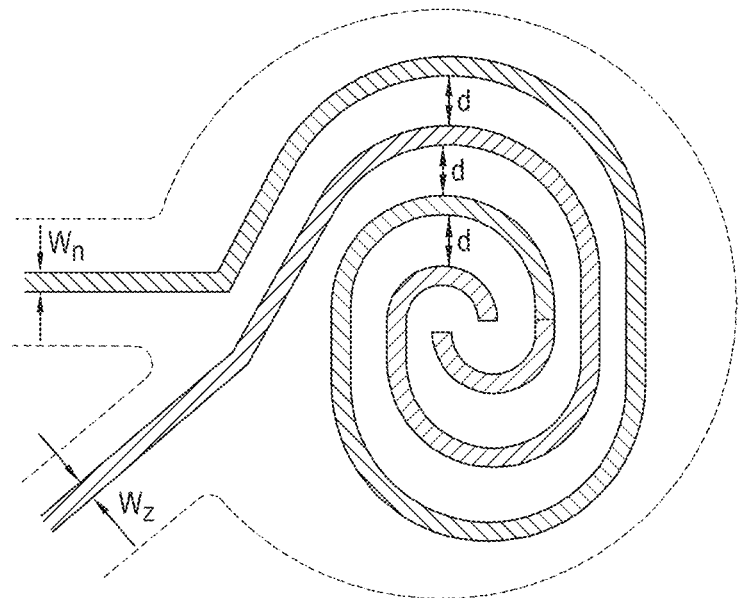

FIG. 3 provides data showing the flow rate of fluids during the opening and closing of the valve;

FIG. 4 provides data showing the directionality of fluid flow in the microfluidic device and;

FIGS. 5A to 5R illustrate different geometries of the valve; and

FIGS. 6A and 6B show an alternative embodiment.

The present invention relates to a single-layer valve for providing a preferential fluid flow in a microfluidic device.

Referring to FIGS. 1A, 1B, 1C and 1D, there is shown a microfluidic pathway 1 for carrying fluids and a pressure conduit 2 that is substantially co-axial to the microfluidic pathway 1. The microfluidic pathway 1 is defined by a substrate 14, side walls 15, 16 and a sealing film 9. The substrate 14 and side walls 15, 16 are fabricated from a hard plastic. The pathway 1 is then completed by the addition of the sealing film 9. The sealing film 9 is applied to the substrate 14 using laser welding along a plurality of laser weld lines 17.

The pressure conduit 2 is a hollow, fluid-filled conduct which includes a discontinuity 3 and, adjacent to the discontinuity 3, an increased surface area region 4. The portion of the sealing film 9 that covers the discontinuity 3 and the increased surface area region 4 is a flexible membrane 20. In some embodiments, the entire sealing film 9 is flexible.

Figure 1A:
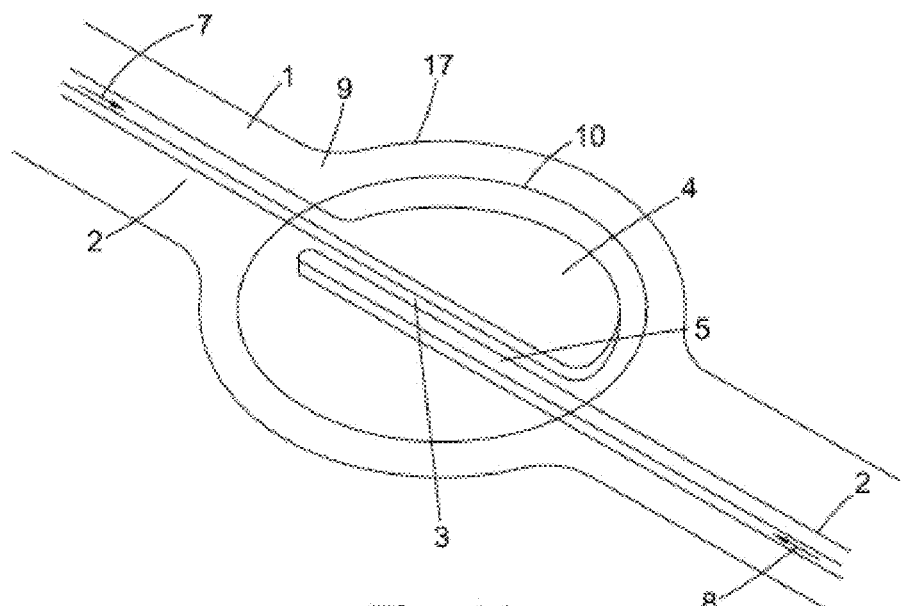
FIG. 1D shows a section through the valve in the open position.
FIG. 1E shows a section through a valve comprising a flexible membrane and a separate sealing film.
Figure 1B:
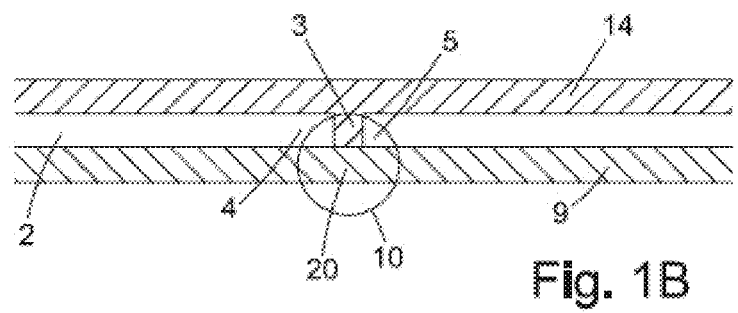
Figure 1C:
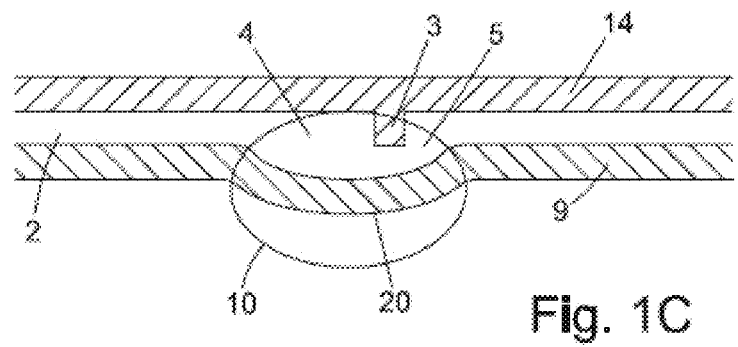

The discontinuity 3, the increased surface area region 4 and the flexible membrane 20 together form a single layer valve 10, as indication by a circle in FIGS. 1A, 1B and 1C. The valve 10 can either be in an open or a closed position.

The discontinuity 3 in the pressure conduit 2 results in an obstruction of fluid flow along the microfluidic pathway 1. In the absence of pressure being applied through the pressure conduit 2, the flexible membrane 20 contacts the surface of the discontinuity 3 and therefore the discontinuity 3 is passively effective and the valve 10 is a closed position.

Furthermore, the membrane 20 is configured to be contacted by an external actuator (not shown) which is configured to apply a positive pressure, greater than the pressure applied through the pressure conduit 2, to the membrane 20. When the external actuator, such as a pneumatically or solenoid actuated plunger, is present, the closure of the valve 10 is actively effective.

In order to open the valve 10, the discontinuity 3 is circumvented to allow fluid to flow along with microfluidic pathway 1. The circumvention of the discontinuity 3 arises due to the deformation of the flexible membrane 20 as a result of pressure applied through the pressure conduit 2. In embodiments where the closure of the valve 10 has been positively effected using an external actuator, this must be removed in order to allow the valve 10 to be opened.

The discontinuity is bounded by a tip portion 5 of the pressure conduit 2 and an increased surface area region 4 bounded by a first surface 4a. The configuration of the increased surface area region 4 is selected in order to achieve the desired preferential flow. There are many suitable configurations some of which are illustrated in FIGS. 5A to 5R of the accompanying drawings.

The selection of the configuration of the tip portion 5 and increased surface area region 4 is dictated at least in part by the manufacturing constraints of the device of which the valve forms a part. The shape of the laser weld line is an important factor. For example, the configuration shown in FIG. 5C is preferable to that shown in FIG. 5D because the shape of the increased surface area region 4 closely mirrors the laser weld line 17. In general a circular weld line will allow for the maximum deflection of the membrane 20, in use.

Another aspect that influences the selection of appropriate tip portion 5 and increased surface area portion 4 is the resistance of the parts. The embodiments all include a constant length discontinuity between the tip portion 5 and the increased surface area region 4. The provision of a constant length discontinuity enables the minimisation of the resistance and avoids areas which have a requirement of increased torque to actuate the valve, such as corners in either the tip portion 5 or the increased surface area region 4.

For example, the configuration shown in FIG. 5A is preferable to that shown in FIG. 5B because the configuration in FIG. 5B has a small increased surface area portion and therefore a large resistance to forward actuation. The example shown in FIG. 5H is a compromise between maximal overlap between the tip portion 5 and the increased surface area portion 4 and a small volume.

Furthermore, the distance from the centre of the valve influences the efficiency of the operation thereof. Therefore, aside from other considerations, FIG. 5N shows a difficult configuration to operate because the tip portion 5 is too far from the valve centre resulting in a small deflection of the membrane due to the proximity of the tip portion 5 to the laser weld line 17.

A further aspect that influences the configuration of the tip portion 5 and increased surface area portion 4 is the manufacturability of the configuration. In general there will be a minimum distance, d, between the tip portion 5 and the increased surface area region 4. This is preferably a constant distance and is equal to the diameter of the drill used to form the discontinuity 3. This is particularly relevant in the embodiment shown in FIG. 5R. It will be appreciated that the invention is not limited to this style of manufacture and it is possible that different configurations from those illustrated could be envisaged without falling outside the scope of the invention and these configurations could be created using alternative manufacturing techniques including, but not limited to, 3D printing and soft lithography.

The width of the first surface is another aspect that influences the hydrodynamic resistance of the valve. In particular, the resistance can be decreased by having a first surface with an extended width. Within the area determined by the valve seat, this width can be enhanced by having a curved first surface, as it is shown in FIGS. 5O, 5P, 5Q, and 5R. In addition or as an alternative, the first surface may be forked, as shown in FIGS. 5K and 5L. Alternatively or additionally, the first surface may include one or more corners, as shown in FIGS. 5E, 5F, 5I, 5J, and 5M. In FIGS. 5E, 5F, 5I, 5J, and 5M this corner is shown to be 90 degrees. It will be appreciated by the skilled person in the art that any angle can be used.

In one embodiment, the width of the first surface is in the range of 10 μm to 100 mm.

As will be apparent from a comparison between FIGS. 5G and 5H the microfluidic pathway 1 can proceed in a substantially straight line through the valve, as shown in FIG. 5H, or it exit orthogonal to its direction of entry. Furthermore, as shown in FIGS. 5P and 5Q, the entrance and exit from the valve may be parallel to one another. Alternatively, as shown in FIGS. 5O and 5R, the entrance and exit from the valve may be at an acute angle. In general the angle through which the fluid pathway turns does not affect the functioning of the valve.

The increased surface area region 4 has a diameter of at least 0.5 to 5 mm, or it may exceed 0.1, 0.5, 1 or 2 mm. The increased surface area region 4 can be less than 5, 2 or 1 mm in diameter. For example, the increased surface area region is at least 2 mm in diameter. The width of the tip portion 5 does not have to correspond to the width of the pressure conduit beyond the increased surface area portion 4.

The increased surface area region 4 may have a geometry that allows the flexible membrane 20 to deflect more easily upon the application of an inlet pressure through the pressure conduit 2, thereby providing a preferential fluid flow along the microfluidic pathway 1. Furthermore, the increased surface area region 4 may be positioned to lead to a short length of the discontinuity 3. In use, a first inlet pressure 7 of between 1 to 1000 kPa is applied in one direction through the pressure conduit 2. The inlet pressure may be greater than or equal to 1 kPa, or it may exceed 5, 10, 20, 40, 80, 100 kPa. The inlet pressure may be less than or equal to 1000, 800, 400, 200, 160, 120, 100 kPa. For example, 200 kPa of inlet pressure may be applied along the pressure conduit. Additionally or alternatively a second inlet pressure 8 can be applied substantially in the opposing direction to the first inlet pressure 7 along the pressure conduit 2.

When the first inlet pressure 7 exceeds a threshold value, the flexible membrane 20 deforms so that it is no longer in contact with the surface of the discontinuity 3, thereby enabling the fluid to flow across the discontinuity 3. The deformation of the flexible membrane 20 comprises the movement of the membrane less than or equal to 100 micrometres in a direction substantially perpendicular to the direction of fluid flow through the microfluidic pathway 1. This results in a preferential fluid flow in the first direction along the microfluidic pathway 1. Thus, the valve 10 is in an open position. Typically, the cross sectional area refers to an area defined by a height and width of the microfluidic pathway 1.

The microfluidic pathway 1 may be at least 0.005 to 10 mm in width, or it may exceed 0.01, 0.05, or 0.1 mm in width. The microfluidic pathway 1 may be less than 4, 2, 1 or 0.5 mm in width. Preferably, the microfluidic pathway is at least 0.1 mm in width. The length of the microfluidic pathway may vary substantially and is dependent on the overall size of the microfluidic device 11.

In addition, the pressure conduit as disclosed in this invention may be at least 0.01 to 2 mm in height, or it may exceed 0.01, 0.025, 0.05, 0.075 mm. The pressure conduit may be less than 2, 1.5 or 1 mm in height. The pressure conduit may be at least 0.07 mm in height. A device with a greater height may provide a better on-off ratio since the internal channel resistance will be smaller compared to the value orifice. It is appreciated that the length of the pressure conduit may vary substantially and is dependent on the overall size of the microfluidic device 11.

As an example, the discontinuity 3 within the pressure conduit may have a gap length of at least 0.01 to 10 mm, or it may exceed 0.05, 0.01 or 0.5 mm. The gap length may be less than 5, 2.5 or 1 mm. The gap length may be 0.1 mm.

The valve 10 present in this invention may be 0.1 to 10 mm in diameter, or it may exceed 0.5, 1.0 or 1.5 mm. The valve 10 may be less than 10 mm in diameter, or less than 5, 2.5, or 2.0 mm. In one embodiment, the valve 10 may be 1.5 mm in diameter.

In some embodiments, the valve 10 may be 0.005 to 5 mm in height, or it may exceed 0.01, 0.05, 1 or 2 mm in height. The valve 10 may be less than 4, 3.5, 3 or 2.5 mm in height. For example, the valve 10 may be 0.07 mm in height.

The valve 10 may have a small swept volume and virtually zero dead volume. As disclosed herein, and unless otherwise stated, the term "dead volume" refers to a portion of the internal fluids that is out of a flow path for example, and the term "swept volume" refers to the additional volume the valve seat provides compared to the bare, valve-free microfluidic pathway. The dead volume of the valve is substantially zero, and the dead and swept volumes combined are at least 0.01 to 1 µL, or they may exceed 0.025, 0.05 or 0.1 µL. The dead and swept volumes combined may be less than 0.75, 0.5 or 0.25 mL. Preferably, the dead volume is zero and the swept volume is less/smaller than or equal to 0.1 µL.

As used herein, and unless otherwise stated, the term "actuator" and "actuating mechanism" refers to a device that causes something to occur. For example, an actuator i.e. a pneumatically actuated plunger used in this invention provides a mechanism that typically affects the flow of fluids along the microfluidic pathways.

When the valve 10 is in an open position, the pneumatically actuated plunger (not shown) can be configured to depress at least a section of the microfluidic pathway 1. More specifically, the plunger can push the flexible membrane 20 against the surfaces of the increased surface area region 4 and the tip portion 5 to close the valve 10. This may result in a partial or complete obstruction of fluid flow in the first and second directions along the microfluidic pathway 1. For example, pneumatic actuator with a piston diameter of 16 mm and an actuation pressure of 3 bar or a 24 V/0.24 A solenoid plunger can be used.

Furthermore, if the plunger is in use before any pressure is applied through the pressure conduit, then the flexible membrane 20 does not deform and remains in contact with the discontinuity 3, as shown in FIG. 1B. Therefore, the valve 10 will stay closed until the plunger is retracted and a pressure difference is applied across the pressure conduit 2 once again.

The use of a pneumatically or solenoid-actuated plunger provides a mechanism for reliably controlling the flow of fluids along the microfluidic pathways. In addition, the use of an actuated plunger may help prevent the random opening of valves whenever there's a change in pressure through the pressure conduit.

Referring to FIG. 1B, there is shown a side view of a valve 10 according to the present invention in the closed position. The flexible membrane 20 is in contact with the discontinuity 3. The pressure of the pressure conduit 2 is also shown in FIG. 1B. When the valve 10 is in an open position as shown in FIG. 1C, the flexible membrane 20 deforms enabling the fluid flows to circumvent the discontinuity 3 within the pressure conduit 2.

Figure 1D:
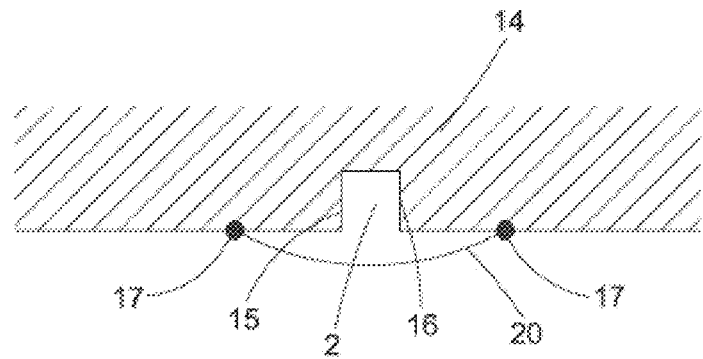
Figure 1E:
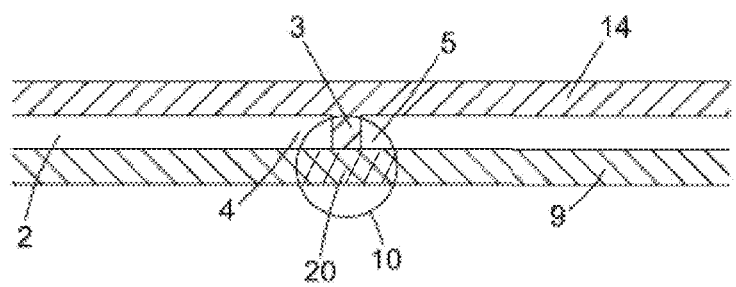

Although FIGS. 1C and 1D are shown with the substrate 14 as the uppermost layer and the flexible membrane 20 as the bottom layer, it will be readily appreciated that there is no orientational bias to the device 11. The device 11 could equally be operated in any other configuration, including, but not limited to, inverted relative to the illustrated version, rotated so that the microfluidic pathways 1 are aligned substantially vertically above one another or any intermediate configuration.

Figure 2:
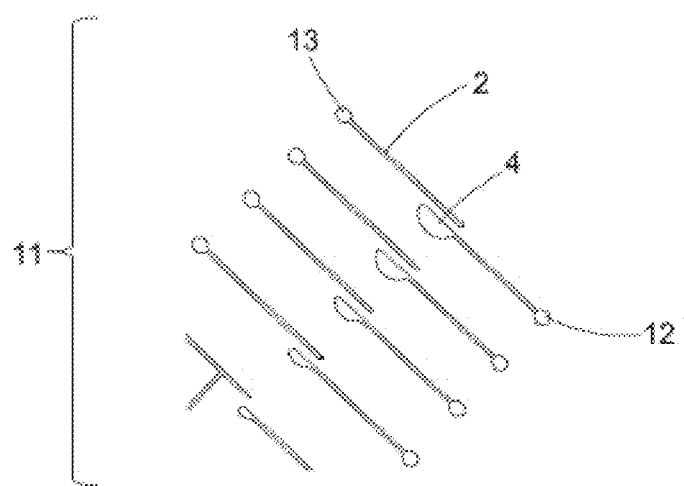
FIG. 2 shows a microfluidic device according to the present invention.

Referring to FIG. 2, there is shown a schematic of a moulded microfluidic device 11 comprising an array of microfluidic pathways 1. In the illustrated example four pathways are provided. However depending on the application in which the device is to be deployed and the spatial constraints of the device 11 itself, the array may comprise fewer than the illustrated four pathways, or more than four pathways such as, for example, five, ten, or twenty pathways. The pathways may contain intersections and splits. The substrate 14 and sealing film 9 are common for all of the microfluidic pathways 1 provided on the device 11. The length of the device 11 is at least 5 mm, or it may exceed 10, 15, 20 or 25 mm. The length of the microfluidic device 11 may be less than 250, 100, 50 or 25 mm. For example, the length of the microfluidic device is 25 mm. Each microfluidic pathway 1 is provided with an inlet 12 and an outlet 13 which are configured to enable fluids predominantly to be introduced into, and exit from, the microfluidic pathway 1, respectively. The fluids that are loaded into the microfluidic pathway 1 are very small amounts of aqueous solution (nL to µL range) which may contain components such as nucleic acids or peptides. Other liquids can be used as well. As illustrated in FIG. 2, the device 11 provides an array of substantially identical microfluidic pathways 1. In some embodiments, not shown in the accompanying drawings, more than one valve 10 can be positioned in series along a single microfluidic pathway 1. For example, two or more valves can be placed in series along a single microfluidic pathway 1. In some embodiments, also not shown in the accompanying drawings, the valves 10 provided in each microfluidic pathway 1 in a single device 11 may be non-identical. For example, the valves 10 may have different shapes and/or sizes. As a result, differing amounts of pressure may be required to actuate the different valves 10.

In some embodiments not illustrated in the accompanying drawings, several microfluidic pathways, each containing at least one valve, can be connected in parallel to a common inlet and/or outlet. This configuration would be appropriate if all of the microfluidic pathways within the device were to be provided with the same fluid or if a microfluidic pathway within the device should be provided with different fluids sequentially or in combination.

As illustrated in FIG. 3, experimental data shows a flow rate within a microfluidic pathway during the opening and closing of the valve. The first inlet pressure can be applied in one direction through the pressure conduit, typically within a range of between 0 to 200 kPa to open the valve. Conversely, the second inlet pressure can be applied substantially in the opposing direction to the first inlet pressure. The flow rate of fluids along the microfluidic pathways may be measured over a time period of 0 to 10000 seconds. The flow rate may be measured with a 1.6 µL/min sensor in the first and second directions of fluid flow. In another example, the flow rate can be measured with an 80 µL/min sensor when one or more valves are placed in a series along the pressure conduit.

As shown in FIG. 3, the flow rate of fluids in both the first and second directions may exceed the maximum of the sensor. In contrast, the flow rate may drop significantly (<0.007 µL/min) in both directions when the valve is closed. Closing of the valve may require an actuation from a typical pneumatic actuator with 3 bar pressure, or a typical 24 V solenoid plunger. Optionally, the closing of the valve can be achieved by reducing the inlet pressure that is being applied through the pressure conduit. Usually, the reduction in inlet pressure is down to between 0 to 1 kPa.

Referring to FIG. 4, there is provided examples of data showing the flow of fluids in the first and second directions along the microfluidic pathways. An inlet pressure (varying from 0 to 200 kPa) can be applied through the pressure conduit and the flow rate is measured with an 80 µL/min sensor. In some embodiments, the maximum flow rate the sensor measured may be greater than or equal to 30 µL/h and less than or equal to 90 µL/h.

As illustrated in FIG. 4, an inlet pressure of 0, 25, 50, 100, 150 and 200 kPa is applied through the pressure conduit. At each pressure interval as mentioned above, the flow rate of fluids (in the first and second direction) along the microfluidic pathway is measured using a sensor. At 200 kPa, the flow rate of fluids in the first direction along the microfluidic pathway is greater than or equal to 80 µL/h. It should be noted that the flow rate of the fluids in the second direction along the microfluidic pathway can decrease by approximately 5 times compared to the flow rate of fluids in the first direction. For example the flow rate of fluids in the second direction along the microfluidic pathway can be 15 µL/h at 200 kPa. The data indicates that fluids preferentially flow in the first direction along the microfluidic pathways. In some embodiments, placing two or more valves in a series along the pressure conduit 2 can decrease the leakage rate of fluids in the microfluidic device.

It should be realised that the foregoing example embodiments should not be construed as limiting. Other variations and modifications will be apparent to persons skilled in the art upon reading the present application.

FIG. 6 shows an alternative approach to obtaining preferential fluid flow. The portion adjacent to the discontinuity does not have an increased surface area. Instead, the portion adjacent to the discontinuity is arranged to provide a different torque to deflect the sealing film. The torque applied is directly proportional to the distance from the laser weld line and therefore a greater torque can be applied by increasing the distance to the laser weld line.

The invention claimed is:

1. A valve comprising
   a microfluidic pathway at least partially defined by a flexible membrane which is configured to deform when subjected to an actuation torque,
   a discontinuity formed between a first surface and a second surface,
   wherein the distance between the first surface and the second surface which defines the length of the discontinuity is constant across the full width of the first surface; and
   wherein the first surface has a greater width than the second surface directly adjacent the discontinuity, such that the valve is asymmetric, and such that the actuation torque on the membrane is larger in a first direction than a second direction substantially opposite to the first direction, and
   wherein the valve is a single-layer valve.

2. The valve according to claim 1, wherein the first surface is tortuous.

3. The valve according to claim 1, wherein the valve is 0.1 to 10 mm in diameter.

4. The valve according to claim 1, wherein the valve is 0.005 to 5 mm in height.

5. The valve according to claim 1, wherein the microfluidic pathway is 0.005 to 10 mm in width.

6. The according to claim 1, wherein the discontinuity has a length of 0.01 to 10 mm.

7. The valve according to claim 1, wherein the valve has dead and swept volumes of 0.01 to 1 µL.

8. A microfluidic device comprising at least one valve according to claim 1.

9. The microfluidic device according to claim 8, wherein the flexible membrane also seals the microfluidic pathway.

10. The microfluidic device according to claim 8, further comprising a separate sealing film disposed over said microfluidic pathway to enclose the microfluidic pathway.

11. The microfluidic device according to claim 8, further comprising a plunger, actuated by a solenoid or a pneumatic actuator, configured to depress at least a section of the microfluidic pathway, thereby obstructing fluid flows in first and second direction.

12. The microfluidic device according to claim 10, wherein the separate sealing film is 10 to 500 µm thick.

13. The microfluidic device according to claim 10, wherein the separate sealing film is applied using laser welding.

14. A method of controlling fluid flow through a microfluidic device comprising the valve according to claim 1, the method comprising flowing a first fluid along the microfluidic pathway,
- applying pressure along the pressure conduit in order to affect a deflection in the membrane and a corresponding change in fluid flow; and
- obstructing the flow of the first fluid by the application of a pneumatically or solenoid actuated plunger.

15. The method according to claim 14, wherein the flow of a second fluid along the microfluidic pathway, substantially opposite to the flow of the first fluid is minimal.

\* \* \* \* \*